Oct. 25, 1932.    F. W. TEMPLE    1,884,377

CUTTING DEVICE

Filed June 7, 1930

Inventor:
Fred W. Temple,

Patented Oct. 25, 1932

1,884,377

UNITED STATES PATENT OFFICE

FRED W. TEMPLE, OF HINSDALE, ILLINOIS, ASSIGNOR TO THE CHICAGO SIGNAL COMPANY, OF CHICAGO, ILLINOIS, A CORPORATION OF ILLINOIS

CUTTING DEVICE

Application filed June 7, 1930. Serial No. 459,814.

This invention relates to cutting devices, and has among its other objects the production of devices of the kind described that are compact, durable, efficient and satisfactory for use wherever found applicable.

A cutting device which embodies a preferred form of the invention comprises a frame having a handle portion; a rubber roller adapted to travel over a support; a second rubber roller driven by the first roller and preferably of smaller diameter than the first roller; a cutting disk constrained to rotate with the second roller; and a second cutting disk driven by the second roller and co-operating with the first disk to cut material through which the cutting device is advanced. The axis of rotation of one of the cutting disks is at an angle with respect to the axis of rotation of the other so that its cutting edge is urged against the cutting edge of the other. This insures that the edges will cooperate efficiently to sever material through which the cutting device is advanced.

Many other objects and advantages will appear as this description progresses, reference being had to the accompanying drawing, wherein.

Figure 1:
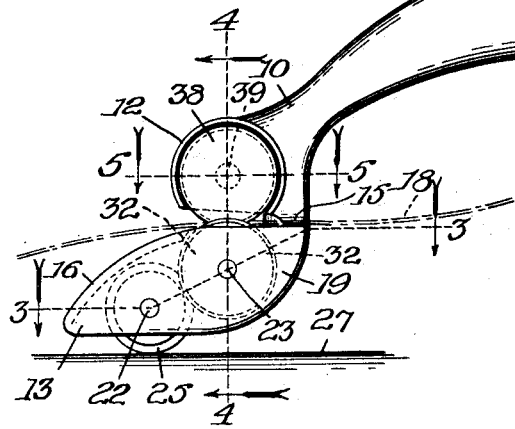
Figure 1 is a side elevation of a cutting device which embodies the invention.
Figure 2:
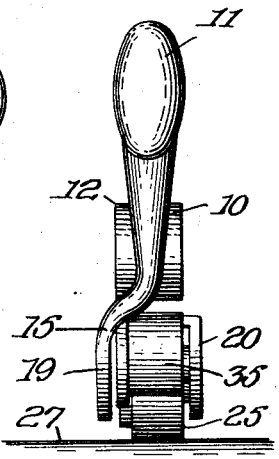
Fig. 2 is a back view of the improved cutting device.
Figure 3:
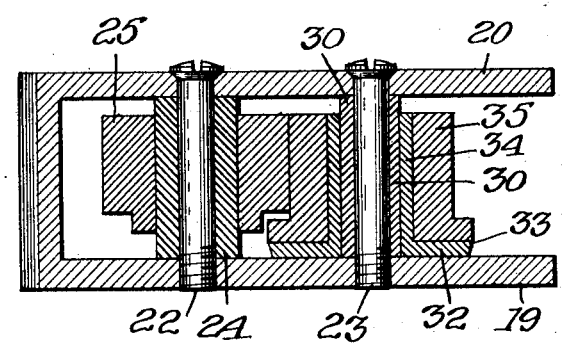
Fig. 3 is an enlarged section taken on line 3—3 of Fig. 1.

Referring to the drawing, wherein I have shown a preferred form of the invention embodied in a cutting device, the reference character 10 designates, generally, a handle 11 and housing portions 12 and 13, the housing portions 12 and 13 being joined to each other by a relatively narrow bar 15 which is preferably formed integral with the housing members and the handle.

The housing portion 13 is preferably provided with a cam or front surface 16 which co-operates with the front surface of the housing portion 12 to guide material to be cut through the cutting device. Thus, I have indicated cloth or paper 18 by dot and dash lines in Fig. 1, which cloth or paper is being cut by the device in a manner hereinafter explained.

Mounted in side walls 19 and 20 of the housing portions 13 are pins 22 and 23. Rotatably journaled upon the pin 22 is a bushing 24 which carries a rubber roll 25 adapted to be advanced along over a table, or the like, upon which the material to be cut has been placed. In Fig. 1, the line 27 indicates the top surface of a table over which the rubber roll 25 may be advanced to cut the material 18.

Rotatably journaled on the pin 23 is a bushing 30 upon which a cutting disk 32 is mounted, the cutting disk 32 being provided with a cutting edge 33 and with an integral boss 34 disposed around the bushing 30. Mounted upon the boss 34 is a rubber roller 35 which frictionally engages the rubber roller 35 which is driven thereby when the cutting device is advanced along a table top, or the like. The outside diameter of that portion of the rubber roller 35 which engages the rubber roll 25 is less than the outside diameter of that portion of the rubber roll 25 thus engaged by the rubber roll 35.

Figure 4:
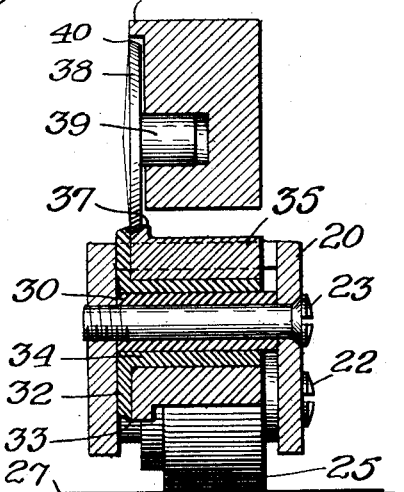
Fig. 4 is an enlarged section taken on line 4—4 of Fig. 1.

The rubber roller 35 is preferably provided with an outwardly extending annular flange 37 adjacent the cutting disk 32, the flange 37 being employed to drive a cutting disk 38 which is preferably formed integral with a stud-shaft 39 rotatably journaled in the housing portion 12 (see Fig. 4). The cutting disk 38 provided with a cutting edge 40 which engages the cutting edge 33 of the disk 32 co-operates with it to cut material through which the cutting device is advanced.

Figure 5:
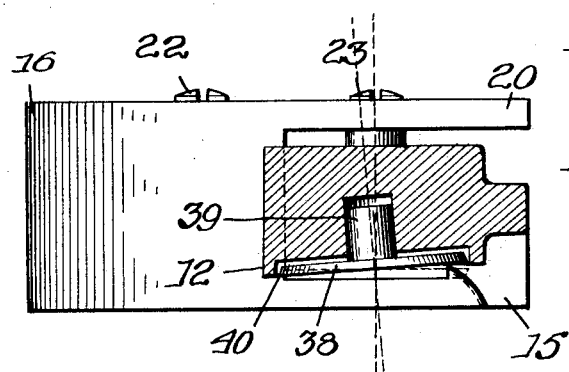
Fig. 5 is a section taken on line 5—5 of Fig. 1.

In the preferred embodiment of the invention, the longitudinal axis of the stud-shaft 39 is inclined with respect to the longitudinal axis of the pin 23. This construction is illustrated in Fig. 5, the inclination of the shaft 39 with respect to the pin 23 being exaggerated for the purpose of better illustration. The dot and dash line 45 indicates the longitudinal axis of the pin 23. This arrangement insures that the cutting edge 40 will co-operate properly with the cutting edge 33 when the cutting device is advanced through the material to be cut. In practice, it is noted that due to the frictional engagement of the disk 38 by the flange 37 and due to the inclined position of the shaft 39 with respect to the pin 23 the cutting edge 40 tends to bear or ride up on the cutting edge 33 and thereby insures that any material through which the cutters advanced will be severed. Thus, materials, such as china-silks which are extremely difficult to cut with scissors, or the like, can be cut quickly and easily with my improved cutting device.

The rolls 25 and 35 and the flange 37 are proportioned so that the peripheral speed of the cutting disk 38 is equal to or a little faster than the peripheral speed of the roller 25, which latter speed is equal to the speed at which the cutting device is advanced during a cutting operation. This construction is advantageous as the material being severed passes between the cutting disk 38 and the flange 37 and, therefore, it is not bunched or torn (see Fig. 4).

The operation of the improved cutting device is substantially as follows: The material to be cut is placed upon a table top or other supporting surface and the cutting device is advanced along the table top or support in such manner that the frictional engagement between the rubber roll 25 and the table top or support results in rotation of the cutting disks 32 and 38. The material is led, of course, over the curved surface 16 and the bar 15 is advanced through the cut.

It will be noted that unlike some devices of the prior art, my improved cutter is not limited to cutting narrow strips from the borders or large sheets or pieces of material. In other words, my cutter may be advanced directly through any part of the material and the bar 15 will simply follow through the cut.

While I prefer to employ rubber rolls, it is to be understood that I am limited to this construction only to the extent indicated in the appended claims as any other suitable yielding material may be employed if it is so desired, and in some instances, I may prefer to employ rolls of non-yielding material.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I claim as new, and desire to secure by Letters Patent, is:

1. A device of the kind described comprising a frame, a roller journaled in said frame, a second roller formed of resilient material and driven by the first-mentioned roller, said second roller being provided with an outwardly projecting annular flange, a cutting disk constrained to rotate with said second roller, and a second cutting disk driven by said annular flange and cooperating with the first-mentioned cutting disk.

2. A device of the kind described comprising a frame, a roller of resilient material journaled in said frame, a second roller driven by the first mentioned roller, said second roller being formed of resilient material and frictionally engaging the first mentioned roller, a cutting disk mounted co-axially and constrained to rotate with said second roller, and a second cutting disk driven by said second roller and co-operating with the first mentioned cutting disk, said second cutting disk frictionally engaging said second roller and having a peripheral speed which is faster than the peripheral speed of the first mentioned roller.

3. A device of the kind described comprising a frame, a roller journaled in said frame, a second roller driven by the first mentioned roller, said second roller being formed of resilient material and frictionally engaging the first mentioned roller, a cutting disk mounted co-axially and constrained to rotate with said second roller, and a second cutting disk driven by said second roller and co-operating with the first mentioned cutting disk, said second cutting disk frictionally engaging said second roller and having a peripheral speed which is faster than the peripheral speed of the first mentioned roller.

In testimony whereof, I hereunto affix my signature, this 28th day of February, 1930.

FRED W. TEMPLE.